United States Patent [19]
Ashbaugh et al.

[11] Patent Number: 5,344,279
[45] Date of Patent: Sep. 6, 1994

[54] MAGAZINE AND PROCESS FOR STACKING CARTONS EMPLOYING SAME

[75] Inventors: Dean L. Ashbaugh, Phoenix; Daniel J. Heinz, Joppa; Pasquale M. Buzzeo, Westminster, all of Md.; Lawrence W. Caldwell, Hanover, Pa.

[73] Assignee: Lever Brothers Company, Division of Conopco, Inc., New York, N.Y.

[21] Appl. No.: 816,410

[22] Filed: Dec. 31, 1991

Related U.S. Application Data

[63] Continuation-in-part of Ser. No. 763,720, Sep. 23, 1991, abandoned.

[51] Int. Cl.$^5$ .............................................. B65G 57/16
[52] U.S. Cl. ........................ 414/788.2; 414/798.9; 414/798.4
[58] Field of Search ............. 414/788.2, 788.8, 794.4, 414/798.9, 789, 795.8, 419, 421; 271/150

[56] References Cited

U.S. PATENT DOCUMENTS

| | | | |
|---|---|---|---|
| 2,306,431 | 12/1942 | Exley | 414/798.2 |
| 2,731,159 | 1/1956 | Donehower | 414/788.2 |
| 2,852,990 | 9/1958 | Roe | 414/789 |
| 3,598,268 | 8/1971 | Wallace | 414/421 |
| 3,655,072 | 4/1972 | Bateman | 414/788.8 |
| 3,661,384 | 5/1972 | Morton | 414/903 |
| 3,858,490 | 1/1975 | Heisler | 271/150 |
| 3,900,115 | 11/1972 | Kumagai | 414/795.8 |
| 3,997,123 | 12/1976 | King | 156/502 |
| 4,278,385 | 7/1981 | Bardenhagen et al. | 414/419 |
| 4,455,117 | 6/1984 | Cartoceti | 414/421 |
| 4,635,428 | 1/1987 | Nagao | 271/150 |
| 4,687,405 | 8/1987 | Olney | 414/421 |
| 4,697,973 | 10/1987 | Hahn et al. | |
| 4,732,315 | 3/1988 | Gunn | |
| 4,782,996 | 11/1988 | Spahni | 229/900 |
| 4,854,817 | 8/1989 | Dorner | |
| 4,880,155 | 11/1989 | Stone | |
| 4,917,663 | 4/1990 | Pazdernik | |
| 4,981,256 | 1/1991 | Giblin et al. | |
| 5,131,899 | 7/1992 | Nagahashi | 271/150 |
| 5,152,473 | 10/1992 | Perego | 414/797.9 |

Primary Examiner—Michael S. Huppert
Assistant Examiner—Gregory A. Morse
Attorney, Agent, or Firm—Gerard J. McGowan, Jr.

[57] ABSTRACT

An improved magazine particularly useful for stacking concentrated or superconcentrated detergent cartons and a process for erecting such cartons and other stackable items. Manufacturing problems resulting from the presence of the handle in high density powder cartons can be reduced by use of a magazine or chute having curved side walls, which accommodate the fanning which normally occurs when the cartons are stacked. Flat tubular carton blanks are inserted, preferably horizontally, into a first carton opening in the magazine and travel therethrough to a second, preferably vertical opening in the magazine, where they emerge. The shape of the magazine accommodates the uneven stacking of the cartons which tends to occur because of the extra localized thickness contributed by the carton handle and the rivets. A case turner is provided for feeding cases of cartons into the magazine.

33 Claims, 8 Drawing Sheets

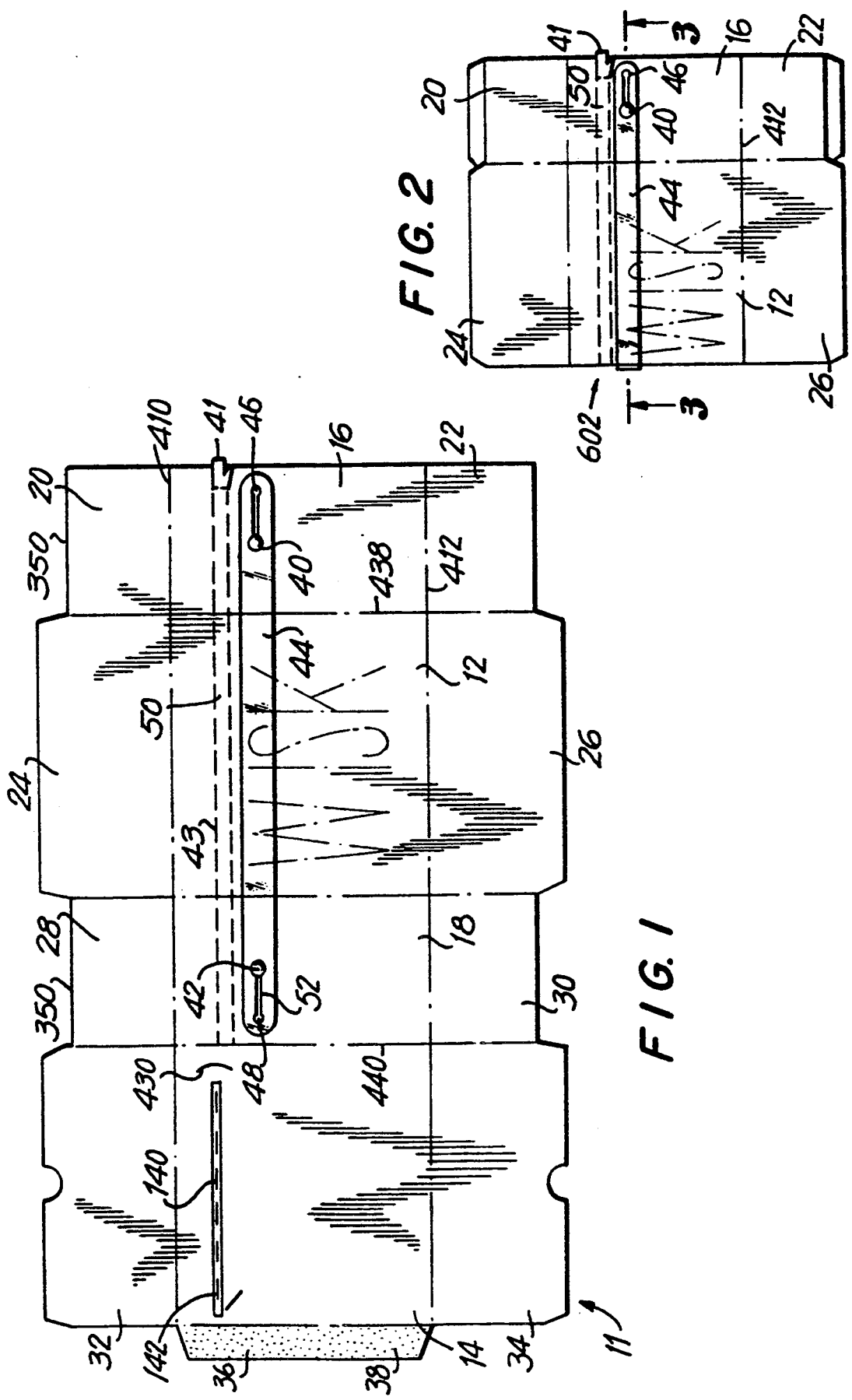

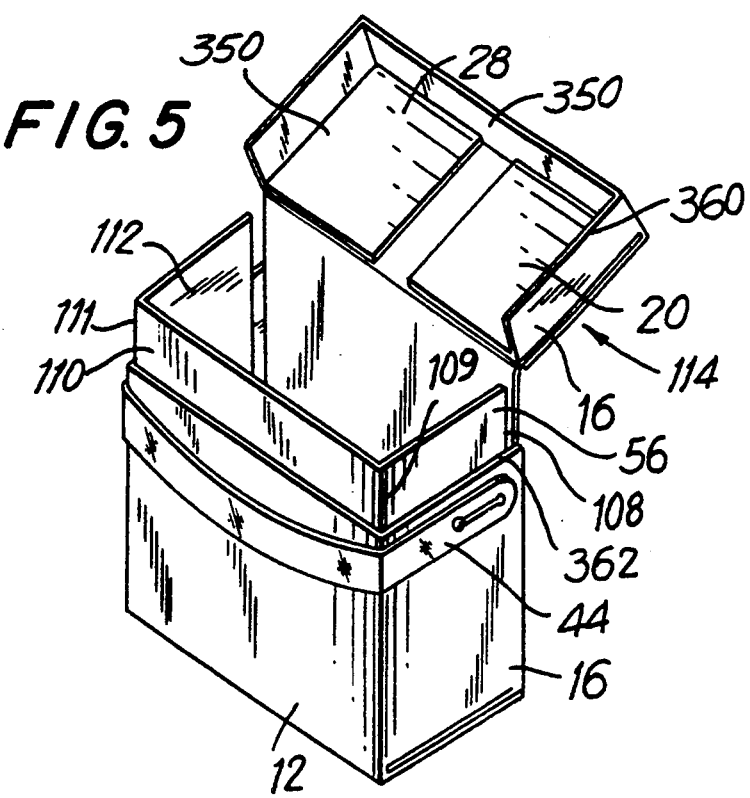
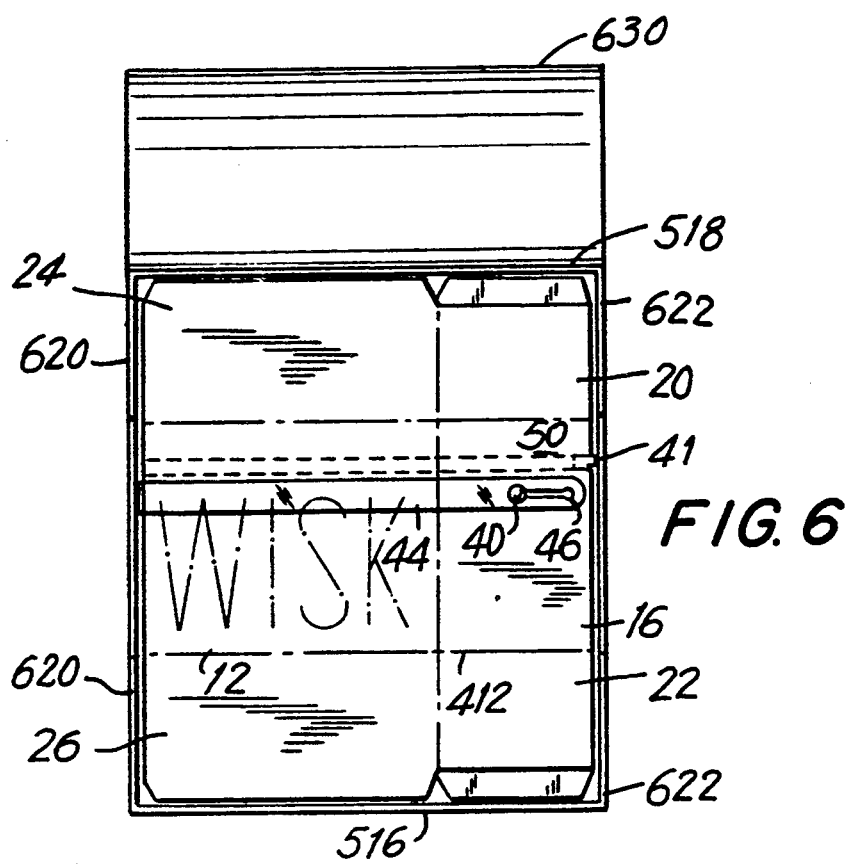

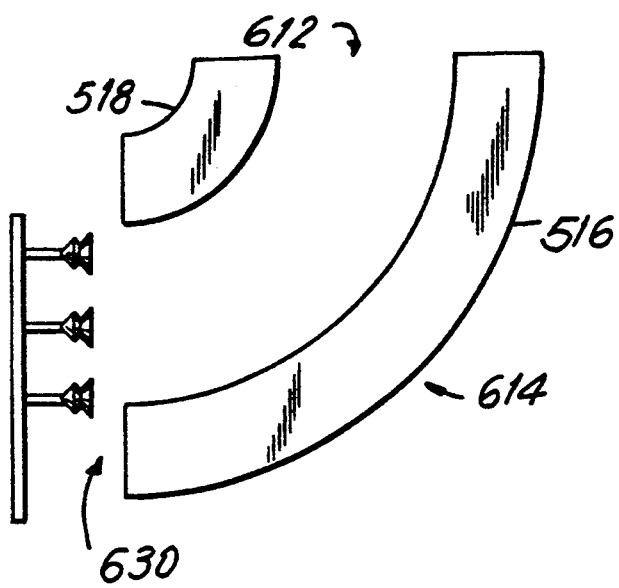
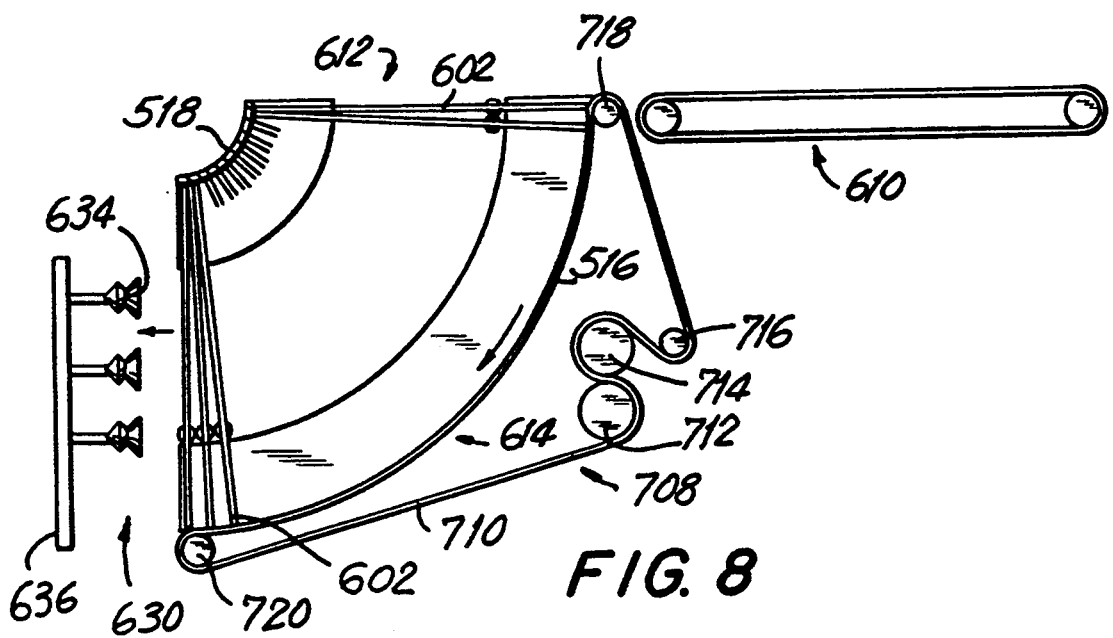

MAGAZINE AND PROCESS FOR STACKING CARTONS EMPLOYING SAME

This is a continuation-in-part application of Ashbaugh et al. Application Ser. No. 07/763,720, filed Sep. 23, 1991, now abandoned.

BACKGROUND OF THE INVENTION

Powdered laundry detergents have often been made by simply spray drying an aqueous slurry of the ingredients and adding to the spray dried powder any required additional ingredients such as heat sensitive bleaches, bleach precursors, enzymes, etc. The densities of powders resulting from such processes have generally been low. Recently, it has been thought desirable to be able to offer to the consumer a product of higher density, i.e., a more concentrated product. Such a product would be expected to have among its advantages the fact that less detergent powder would be used to effect a comparable amount of cleaning and that less storage space would be required as a result of its concentrated nature.

Changes in the density of detergent powders also require changes in the packaging of such powders. For instance, the increase in density makes desirable the use of smaller packages to take advantage of the increased concentration of the product. Moreover, smaller packages and the inclusion of handles are desirable due to the increased weight of the product.

A previous package for containing detergent powders of higher concentrations is disclosed in the Giblin et al. co-pending application which issued as U.S. Pat. No. 5,058,748, the disclosure of which is hereby incorporated by reference herein. The package includes four principal panels, which constitute the four walls of the carton. The walls are shorter than those of the typical detergent carton. Attached to the principal panels are the glue flap and various major and minor flaps for closing the top and bottom ends of the carton. Attached to the two side panels of the carton by means of a rivet is a handle. The carton includes a tear tape extending through three of the principal panels and partially through a fourth. When the tear tape is removed, the fourth panel acts as a hinge, and a top which can be opened and closed is formed.

A disadvantage of prior high density powder packages is that when the carton is stacked in its flattened tubular form prior to erection, the handle and rivets tend to render the carton unbalanced and to destabilize the stack. This can markedly impair the processing of the cartons. One solution to this problem is proposed in the Giblin et al. application mentioned above wherein spacing means are provided within the carton for balancing the stacks. Patents discussing solutions to balancing problems in detergent cartons including plastic fitments include Gunn U.S. Pat. No. 4,732,315, Spahni U.S. Pat. No. 4,782,996, Stone U.S. Pat. No. 4,880,155 and Giblin et al. U.S. Pat. No. 4,981,256.

Dormer U.S. Pat. No. 4,854,817 discloses a chute for feeding articles. Hahn et al., U.S. Pat. No. 4,697,973 discloses a folded carton handling apparatus including suction cups. Pazdernik U.S. Pat. No. 4,917,663 is directed to a carton blank conveyer having vacuum means.

SUMMARY OF THE INVENTION

The present invention is directed to an improved magazine particularly useful for stacking concentrated or superconcentrated detergent cartons and to a process for erecting such cartons. It has been discovered that manufacturing problems resulting from the presence of the handle in high density powder cartons can be reduced by use of a magazine or chute having curved side walls, which accommodate the fanning which normally occurs when the cartons are stacked. Flat tubular carton blanks are inserted, preferably horizontally, into a first carton opening in the magazine and travel therethrough to a second, preferably vertical opening in the magazine, where they emerge. The shape of the magazine accommodates the uneven stacking of the cartons which tends to occur because of the extra localized thickness contributed by the carton handle and the rivets.

The magazine and process of the invention are believed useful not only with respect to concentrated and superconcentrated detergent cartons, but to stackable cartons and objects generally, particularly where the objects stack unevenly.

Preferably, the tubular cartons are assisted through the magazine by conveyor means such as a conveyor belt adjacent to the lower side wall of the magazine. Also, means may be advantageously included for stopping the cartons as they exit from the magazine and for opening the cartons as they are picked from the magazine.

In another embodiment of the invention, a case turner is used to feed cartons into the magazine. The case turner, which is preferably box-like in configuration, receives a case full of cartons and then rotates so that it is inverted and stands over the entrance to the magazine. The case turner includes means adapted to permit the cartons to be loaded into the magazine in such a way as to minimize any potential disruptions. An adjunct carton loader may also be used.

For a more complete understanding of the above and other features and advantages of the invention, reference should be made to the following detailed description of preferred embodiments and to the accompanying drawings.

BRIEF DESCRIPTION OF THE DRAWINGS

FIG. 1 is a top plan view of a carton blank which may be folded and glued to produce the flat tubular carton of FIG. 2.

FIG. 2 is a top plan view of a flat tubular carton which may be processed according to the invention.

FIG. 5 is a perspective view of the carton of FIG. 3 after opening.

FIG. 6 is a top plan view of a magazine according to the invention having a flat tubular carton inserted in its open end.

FIG. 7 is a front elevational view of a magazine according to the invention together with a carton picking apparatus.

FIG. 8 is a cross section of a magazine filled with cartons according to the invention and further including conveyor means.

DETAILED DESCRIPTION OF THE INVENTION

Figure 3:
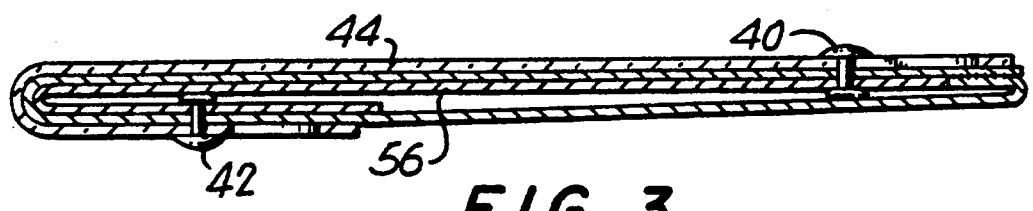
FIG. 3 is a cross section along the lines 3—3 of FIG. 2.
Figure 4:
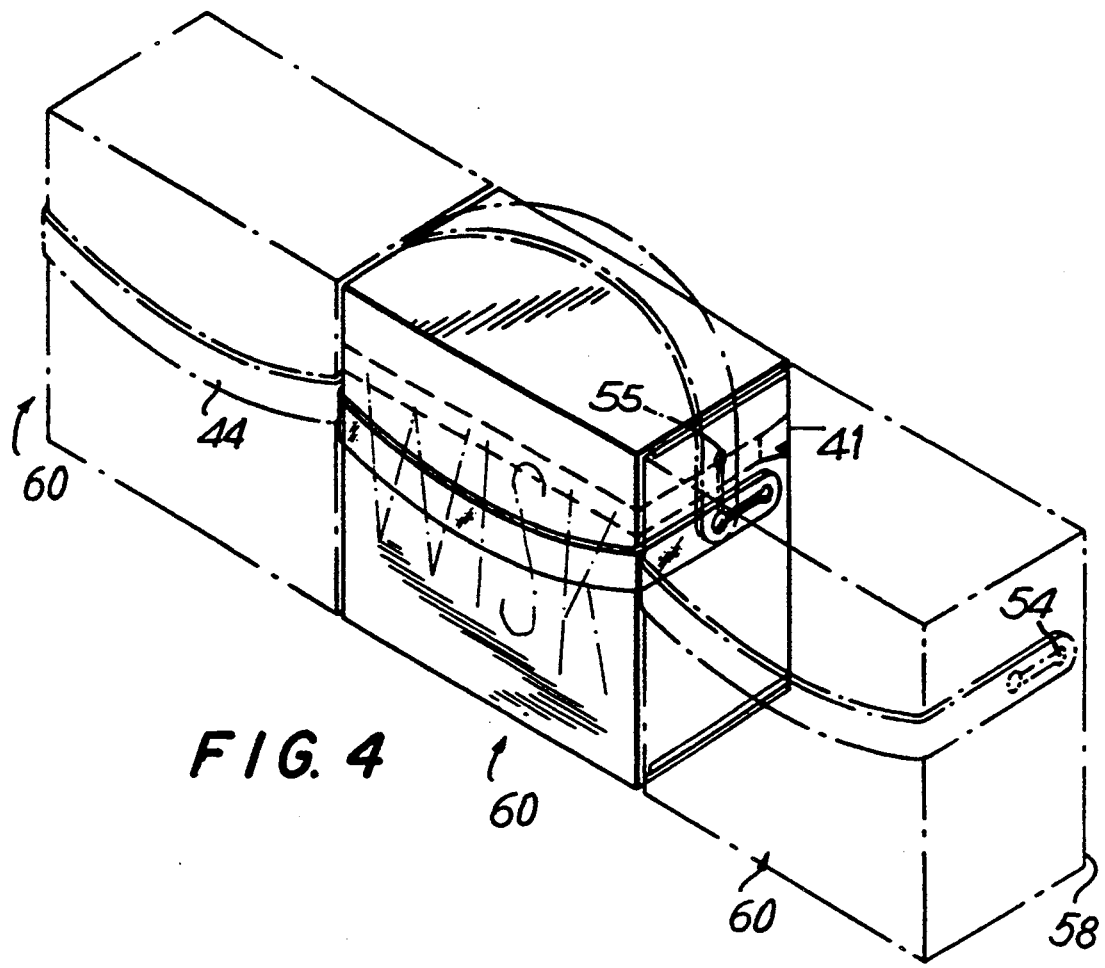
FIG. 4 is a top perspective view of three erected cartons made from the flat tubular carton of FIG. 2.

The magazine and process of the invention are advantageously used in the erection of cartons and carton blanks of the type illustrated in FIGS. 1-5. However, the invention may be used to construct any carton, particularly cartons which are not balanced so that they stack unevenly. Moreover, the invention may be used in the processing of any stackable objects, particularly those which stack unevenly.

Referring to FIG. 1, the carton blank 11 comprises front panel 12, first and second side panels 16 and 18, respectively, and rear panel 14. Side panel 16 includes upper and lower flaps 20 and 22, respectively. Extending from the top and bottom of front panel 12 are upper and lower outside major flaps 24 and 26, respectively. Similarly, upper and lower minor flaps 28 and 30 extend from the top and bottom of side panel 18, whereas upper and lower inside major flaps 32 and 34 extend respectively from the top and bottom of rear panel 14.

Glue flap 36 extends from the free edge of rear panel 14. Adhesive means 38 are applied to the glue flap at some point during construction. When the carton is in the flattened tubular form shown in FIG. 2, adhesive means 38 adheres the front surface of glue flap 36 to side panel 16.

Attached to side panels 16 and 18 by rivets 40 and 42 a handle 44. The handle, which takes the form of a strap, is narrow in width and long in length. The handle 44 is preferably flexible and clear, so that any printing on front panel 12 can be seen through the handle. Preferably, the handle slightly magnifies any printing on the front panel. Handle 44 includes dumbbell-shaped apertures 46 and 48, respectively at its ends, which accommodate rivets 40 and 42.

As best seen in FIGS. 1 and 2, a tear tape 50 is provided for opening of the carton. The tear tape comprises two generally parallel lines of perforations 43 in the paperboard and finger tab 41 for grasping by the consumer. Preferably, the finger tab extends beyond the edge of the carton for easier access. Instead of perforations, other separation means such as cut scores may be employed. The cut scores extend partially through the paperboard. The tear tape extends from first side panel 16 through front panel 12, second side panel 18 and terminates functionally on rear panel 14 by virtue of cut 430. Advantageously, rivets 40 and 42 are located below the level tear tape 50 so that the handle need not move when the cover is opened and closed.

The role of the rear panel as a hinge is facilitated by the addition of hinge means thereto. Rear panel 14 includes two hinge means, perforations 140 and score line 142, both of which extend along the same line as the uppermost of the tear tape clot score or perforations 43. The illustrated hinge means acts as a deadfold hinge for the erected carton in that it keeps the open cover in the open position until the consumer closes the cover.

As can be seen in FIG. 3, each of the rivets 40 and 42 extend through handle 44, the side panel to which it is attached, and through optional inside liner 56.

Figure 10:
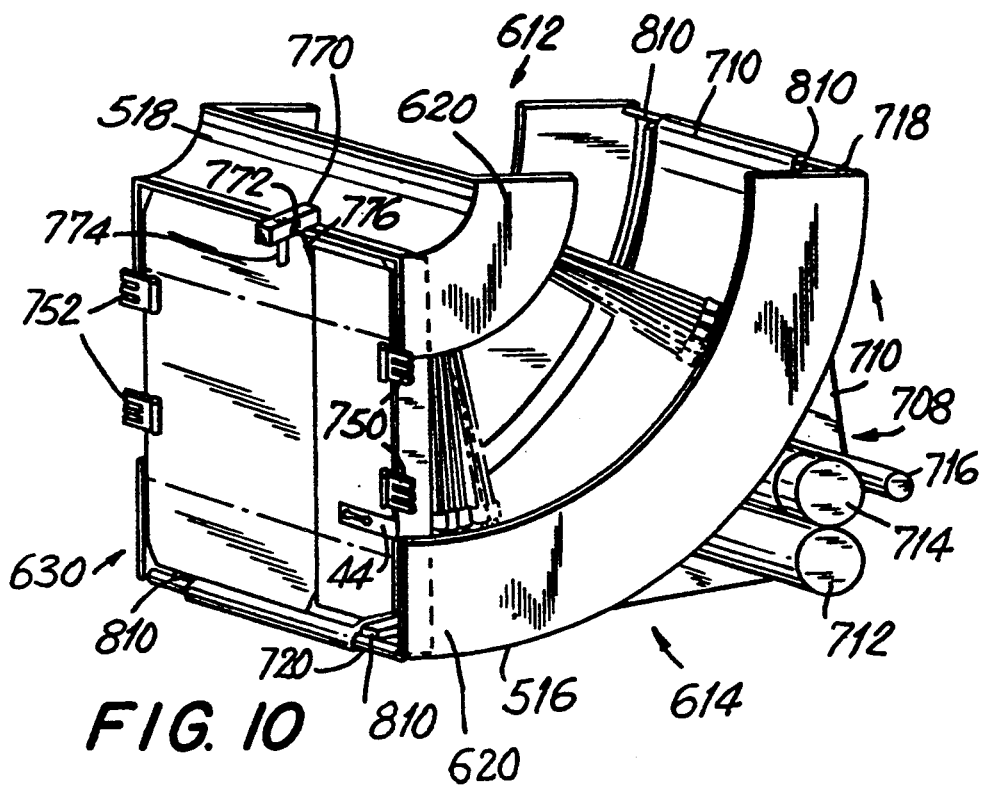
FIG. 10 is a perspective view of the magazine of the invention together with a conveyor belt.

The carton of the invention is fabricated by preparing the carton blank shown in FIG. 1 and erecting the carton. The first step in the erection of the carton is adhering the front surface of glue flap 36 to the rear surface of side panel 16 to obtain a flat, tubular partially erected structure such as that shown in FIGS. 2 and 3. While the carton of FIG. 2 is folded along the score between panels 12 and 18 and at the junction between panels 14 and 16, it may well be desirable to fold it along scores 438 and 440 instead. The carton shown in the magazine of FIG. 10 is folded in this manner.

Generally, it will be desirable to stack the folded, flattened, tubular cartons prior to erecting the cartons. However, when partially erected cartons are stacked, the rivets and the handle tend to create a localized increase in thickness which results in an imbalance which will cause the stack to lean or to topple over. Unbalanced stacking can impede or even stop the process of erecting the cartons and may also slow or stop the manufacturing of the product which goes into the carton.

Referring to FIG. 8, after it is formed, the tubular, flattened carton 602 is fed horizontally by conveyer 610 (not drawn to scale) into the opening 612 of magazine 614. As seen in FIGS. 6-8 and 10, opening 612 is defined by sidewalls 516 and 518, front carton motion restraining means 620 and rear carton motion restraining means 622, which may be flanges, as illustrated. Sidewalls 516 and 518 are curved. The curves are generally arcs of a circle. It will be understood that within the magazine 614 the flat tubular cartons will rest one against the other. FIG. 8 omits for convenience explicit representation of all of the cartons and instead denotes the intermediate cartons by the short lines perpendicular to side wall 518.

As seen in e.g., FIG. 8, the inside of the curved sidewall 516 forms a concave curve.

In accordance with one aspect of the present invention, the curved sidewalls accommodate a stack of the cartons to be fed through the magazines as they would naturally lie after stacking. Cartons having an imbalance tend to be skewed when stacked and the curvature of the sidewalls 516 and 518 accommodates the curvature in the stack. The magazine has a second opening 630 the plane of which is disposed generally perpendicularly to the plane of the first opening 612. As a result, folded tubular cartons emerging from the magazine will be perpendicular to the cartons fed in through first opening 612. Although the angle between the first opening and the second opening is preferably 90°, other angles may be appropriate, particularly within the range of from 70° to 95°.

Figure 9:
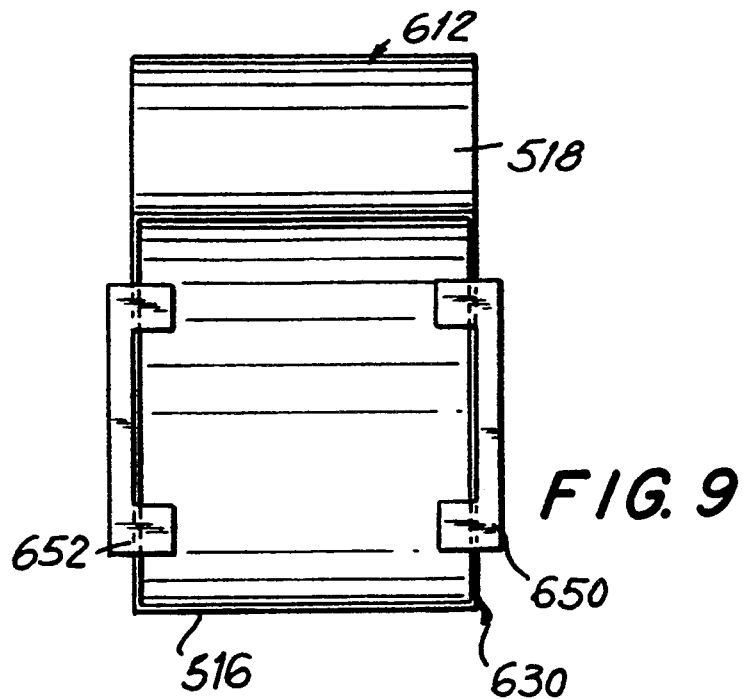
FIG. 9 is a side elevational view of the magazine of the invention.

Typically, once the flattened tubular cartons reach the second opening 630 in the magazine, they are prevented from simply flying out of the opening by a stopping means such as side stopping flanges 650, 652 shown in FIG. 9 or 750, 752 seen in FIG. 10. The side stopping flanges are secured to the carton restraining means by any appropriate means. The stopping means project into the path of the flat carton as it emerges from the magazine and prevents it from exiting. Thereafter, the carton is picked by suction cups 634 of carton picker 636.

The magazine may also advantageously include top and bottom retainers. Referring to FIG. 10, magazine 614 includes top carton retainer 770 and a bottom retainer (not shown). Top retainer 770 is fastened to side wall 518 and includes outwardly extending arm 772 and depending prong 774. Prong 774 is positioned so as to pass unobstructed through notch 776 separating the upper major and minor flaps of the carton proximal to the opening 630 when the carton is pulled out of the magazine by carton picker 636. As the carton is pulled from the magazine, prong 774 passes through notch 776 and encounters the second major flap of the carton (not shown). By obstructing momentarily the second major flap as the carton is pulled from the magazine it tends to open the carton.

Advantageously, belt guides 810 are present on sidewall 516 to limit the motion of conveyor belt 710, the purpose of which is explained below. Belt guides 810 comprise UHMW (ultra high molecular weight) plastic with graphite and are 0.125 inch thick. They lie on either side of the belt 710. The height of belt 710 above sidewall 516 will vary depending on the tension on the belt and the shape of the sidewall. The bottoms of the cartons may touch the belt guides rather than the conveyor belt 710 at some locations. In other locations, particularly toward the center of the chute, the bottoms of the cartons will contact the belt and push it to or below the level of the tops of the belt guides.

After the carton is pulled from the magazine, it is squared, and the minor flaps are folded inwardly. Subsequently the inside and outside major flaps respectively, are folded inwardly and adhered to each other.

The magazine may be made from any suitable material, typically a metal such as steel or aluminum or a durable plastic. As can be seen in FIGS. 7 and 8, one side wall of the magazine will typically be shorter than the other wall, in accordance with the natural stacking of the unbalanced cartons.

The magazine and the process of erecting cartons in accordance with the present invention facilitate the manufacturing of the cartons by incorporating the natural stacking curvature of the unbalanced cartons into the manufacturing line. Therefore, it becomes unnecessary to take additional measures to ensure even stacking.

The dimensions of the opening in the magazine or chute are preferably tailored to those of the folded tubular cartons to ensure that they fit comfortably within the magazine and move smoothly therethrough. Generally, it will be desirable for efficient operation that the distances between the outer edges of the folded tubular carton and the sidewalls and restraining means be small so that the periphery of the folded tubular carton is just barely accommodated within the opening of the magazine as well as within other portions of the magazine.

The curvature of the walls of the magazine are preferably tailored to the angle at which the cartons stack. The angle of stacking per carton may be measured by stacking vertically a convenient number of cartons, e.g., 15, and measuring the difference in height between ends of the carton. The angle for the 15 cartons can then be calculated and the angle per carton is obtained by dividing by the total number of cartons stacked. The angle may, for instance, be 0.3° per carton, 0.5° per carton, 0.8° per carton or even higher. Cartons of the type illustrated have been found to have an angle of 0.9° per carton.

Although the flat, tubular cartons move through the magazine by virtue of the force of gravity, it may be advantageous to employ means to assist their movement. In particular, as the tubular cartons approach exit opening 630, the force of gravity on flaps which support the carton at the bottom may cause these to drag and it may be useful to include conveyer 708 as shown in FIG. 8 to assist the even movement of the tubular cartons. As seen particularly in FIG. 10, the flaps supporting the carton will generally be the major flaps, particularly the top major flaps.

Conveyor 708 includes belt 710, which is driven by driving roller 712. Driving roller 712 is associated with a motor, not shown. The belt travels from driving roller 712 along major following roller 714, minor following roller 716, and up to minor following roller 718 adjacent to the top of magazine side wall 516. The belt then travels downwardly along the inside side wall 516 in the direction of the arrow shown in FIG. 8. At the bottom of side wall 516, the belt travels around minor following roller 720 and returns to drive roller 712, forming a closed loop.

In operation, conveyor 708 is activated, preferably prior to feeding stacks of flattened tubular cartons (or individual flattened tubular cartons) into magazine 614 via conveyor 610. The movement of belt 710 in the direction of the arrow assists the cartons in their movement down the magazine toward opening 630, eliminating or minimizing drag caused by the force of gravity on the minor flaps at the bottom of the cartons. The dimensions of the belt are tailored to the dimensions of the magazine. A 0.06 inch thick 6 inch wide belt of 2 ply polyester impregnated with urethane available from Columbia Rubber Company of Beltsville, Md. as P.N. E8-240-v-U2H has been found to be useful.

The belt preferably imparts low friction and is durable, resisting damage caused by the carton edge.

The belt is movable relative to the side walls of the magazine.

Figure 11:
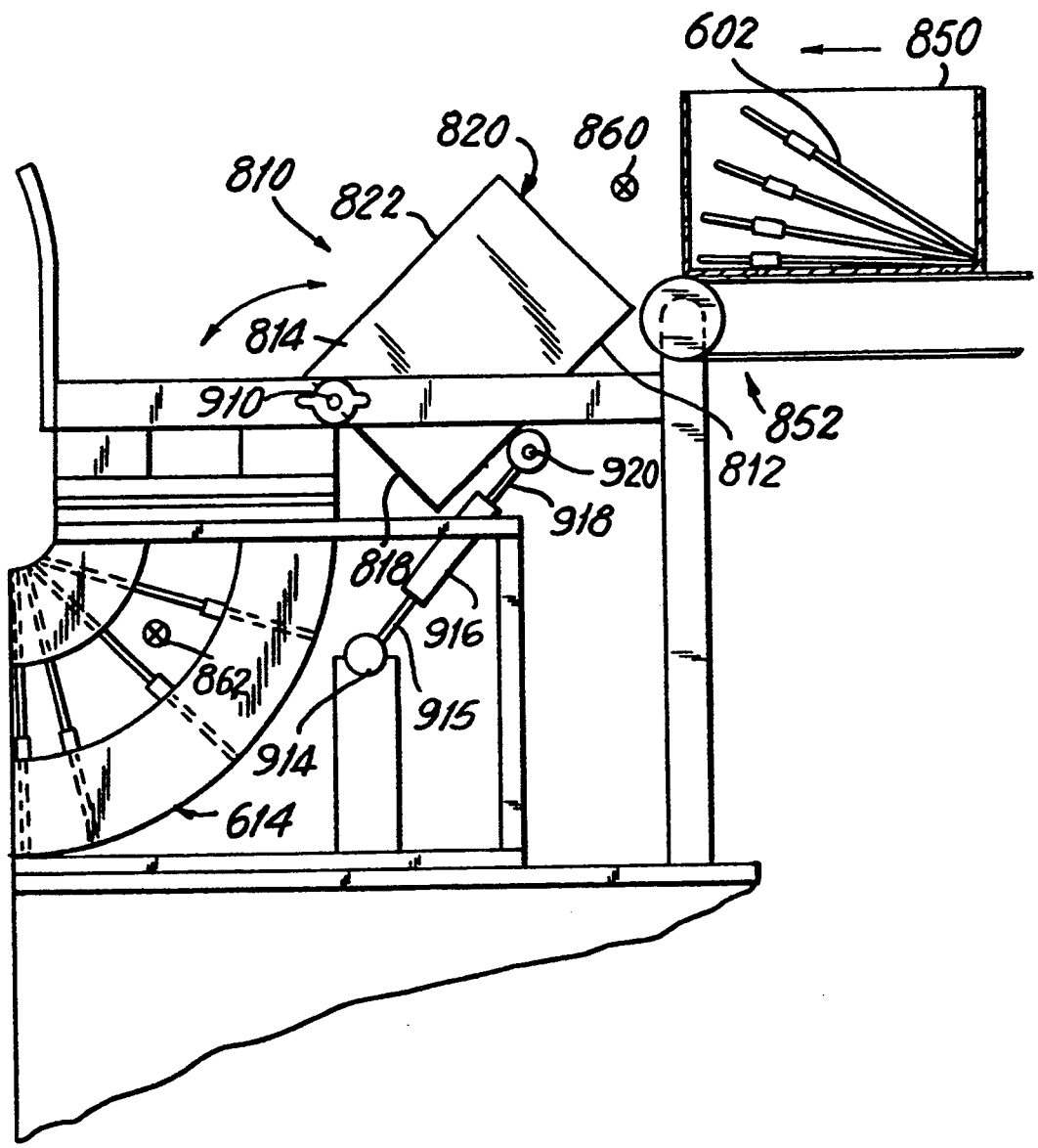
FIG. 11 is a front elevational view of the magazine of the invention together with the case turner of the invention.
Figure 12:
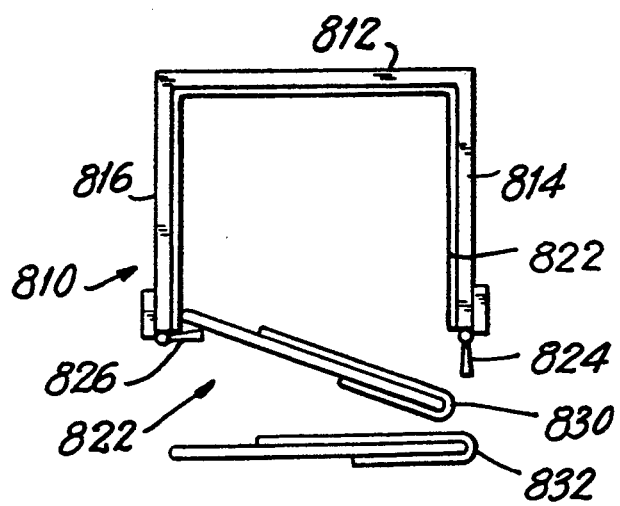
FIG. 12 is a front elevation of a case turner in position to load cartons into the magazine.

A particularly advantageous means of feeding the cartons into the magazine is shown in FIG. 11. Flattened tubular cartons 602 in case 850 ( which is open at the top) are fed by conveyer belt 852 to case turner 810. As best seen in FIG. 12, case turner 810 includes a solid bottom 812, sidewalls 814 and 816, front wall 818 and a mostly open top 822. A rear opening 820 is provided to permit the case 850 to be fed into the case turner. Along the top edges of walls 814 and 816 are flanges 824 and 826 which are movable between two positions, a first or closed position perpendicular to the sidewalls and a second or opened position parallel to the sidewalls. Means are provided to move loch of the flanges between the two positions and to keep it securely in its position. As such, each of the flanges 824 and 826 is capable of serving as a "trap door," the purpose of which will be explained below. At the time that the case of cartons is fed into the case turner, flanges 824 and 826 will typically be in the closed position.

Figure 14:
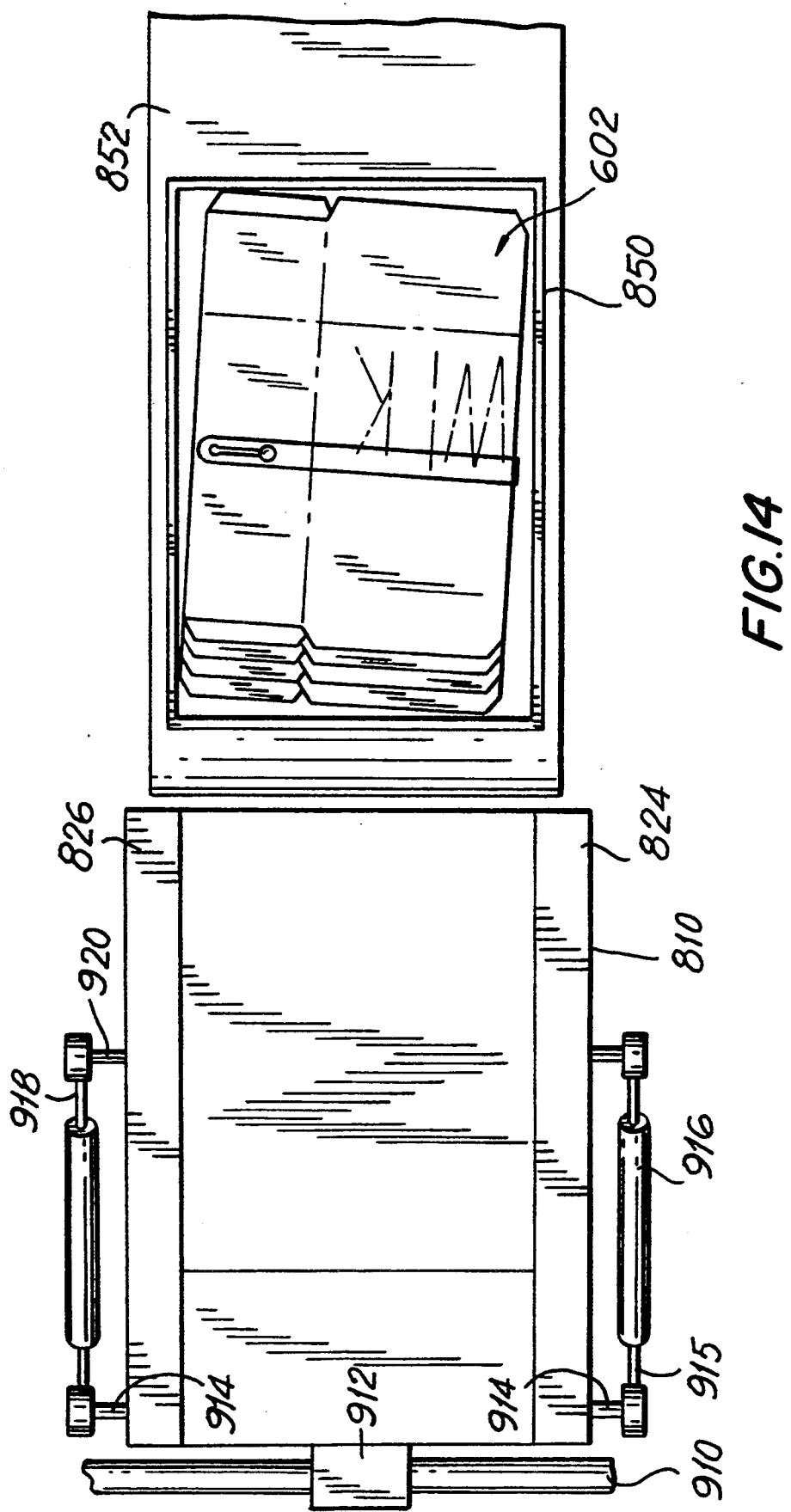
FIG. 14 is a top plan view of the case turner and the case shown in FIG. 11.

Means are provided to rotate the case turner from its case receiving position adjacent the conveyer belt to an inverted position above first opening 612 of the magazine. In its case receiving position, it will generally be below and at an angle up to about say 50° relative to the conveyer belt, preferably at am angle of between 10° and 45° especially about 30°. As seen in FIGS. 11 and 14, the rotating means may comprise pivot shaft 910, bearing housing 912 containing bearings enabling the case turner 810 to rotate on shaft 910, piston mounting rod 914, pistons 916, piston rods 918, rods 915, and case turner mounting rod 920. Movement of the case turner is effected by activation of the piston whch causes the case turner to rotate about pivot shaft 910. Preferably, the dimensions of the case turner are smaller than that of the case, to facilitate rotation of the case turner.

When it is desired to load the cartons from the inverted case turner 810 into magazine 614, flange 824 is moved from the closed perpendicular position to the open parallel position. It will be appreciated that when the flanges 824 and 826 are in the closed perpendicular position, flattened carton 602 will be retained within inverted case turner 810. As seen in FIG. 12, with the case turner 810 positioned inverted above the top flattened carton 832 within the magazine, once flange 824 moved to the open position, the bottom-most carton 830 within the case turner will rest upon the top carton 832 in the magazine. Bottom tubular carton 830 will be disposed at an angle to the carton 832 in the magazine, depending upon, inter alia, the distance between the case turner and the top carton. That distance will increase as cartons are removed from the magazine at exit opening 630. As the distance increases, the angle formed between the bottom carton 830 and the plane of opening 822 (parallel to bottom wall 812) likewise increases until carton 830 clears flange 826 and drops on top of the cartons below. Thus, the cartons are fed into the magazine. The cartons may be fed individually or in groups.

Figure 13:
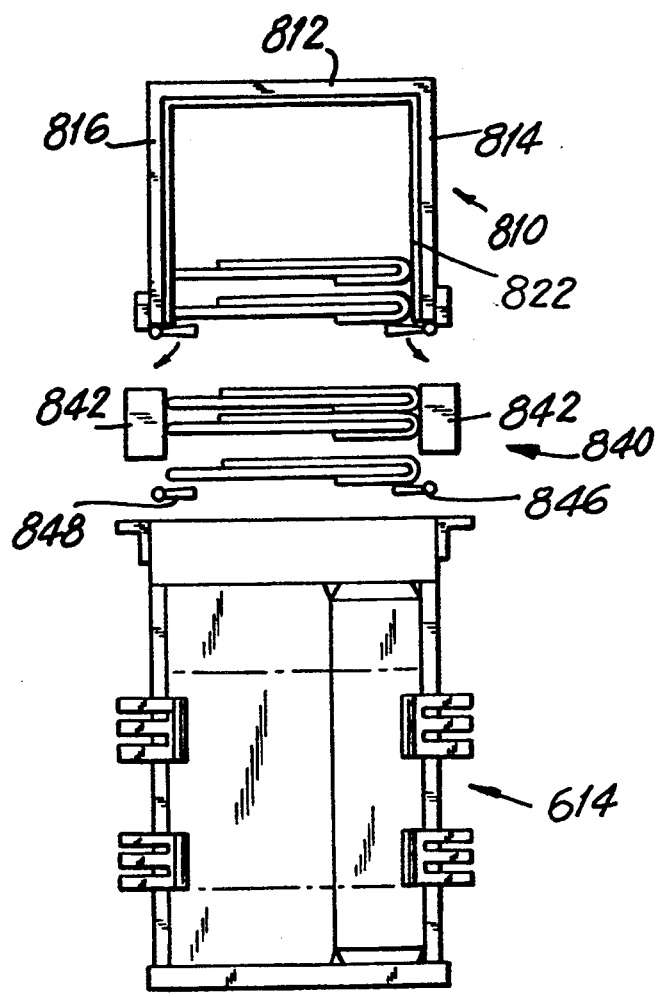
FIG. 13 is a front elevational view of a magazine having a case turner and an adjunct carton loader positioned above.

As can be seen in FIG. 13, cartons may be fed from case turner 810 into an adjunct carton feeder 840 prior to entering the magazine. Adjunct feeder 840 includes brakes 842 and carton feeding flanges 846 and 848. In this embodiment, both trap doors 824 and 826 open permitting the cartons to drop onto adjunct carton feeder 840. While the cartons are within the adjunct carton feeder 840, the cartons having already been dispensed from case turner 810, case turner 810 may now rotate back to receive another case load.

Brakes 842 may be applied to hold a predetermined number of cartons. Below the brakes, carton feeding flanges 846 and 848 also serve to keep cartons within the adjunct carton feeder. When the magazine is ready to receive the cartons, carton feeding flanges 846 and 848 open, releasing a predetermined number of cartons below the brake whereby they are fed into the magazine. After an initial load of cartons has been released from adjunct carton feeder 840, carton feeding flanges 846 and 848 close and brake 842 releases, permitting more cartons to fall onto the carton feeding flanges. The cycle continues until the adjunct carton feeder is empty. Typically, 5 or 6 cartons will be released at a time from the adjunct carton feeder. Brakes 842 may comprise air cylinders on each side which effect a medial movement of (inner) brake walls of the adjunct carton feeder to hold the cartons in position.

After the last carton has left the case turner, either before, during, or after the case turner rotates back into case receiving position, the empty case can be removed and disposed of by means of a vacuum arm device, similar to the one employed remove cartons from the magazine seen in FIG. 7. Once the empty case has been removed, the case turner receives a new case from conveyer 852 after rotation back into its initial position.

The illustrated feeding apparatus can meter small numbers of cartons into the magazine to eliminate sudden weight variations on the carton which is to be picked out of the magazine. Such weight variations could result in jams or misses. Photo cells 860 and 862 can be used to detect the locations of the case being fed to the magazine and of the cartons within the magazine, respectively.

In order to accommodate changes in carton and case size, all components feeding into the magazine may be mounted on common plates permitting quick adjustment for case and carton width. Preferably, all cases used are the same height. Also, an insert may be placed within the case turner as needed to accommodate smaller case sizes.

The present invention avoids the problems caused by unbalanced carton stacking by feeding the cartons into a magazine or chute which accommodates the uneven stacking.

Preferred dimensions measured in inches for the cartons are as follows. Where the length of the erected carton (i.e., the length of the front panel) is B, the width of the carton is A, and the diameter of the rivet shank is C, the following are preferred approximate dimensions for the handle and rivets:

length of handle: $2A+B$;

distance between center points of the two distal semicircular ends:

minimum: $1.33A+B$; maximum: $2A+B-0.75$ distance between center points of the two proximal semicircular ends: $A+B+\frac{1}{8}$ width of straight and narrow handle portion: $0.9C$;

distance from top of erected carton to midpoint of rivet: $0.4A$;

distance from end of side panel to center of rivet: $0.5A$.

Where cartons of smaller sizes than those for which the main magazine is designed are to be fed through the line at different times, full or partial magazines of reduced dimensions tailored to the dimensions of and imbalance in the smaller sized cartons may be inserted into and attached to the main magazine of the invention. This will permit feeding of smaller cartons without interrupting the processing to change magazines.

The carton of the invention may be made of any of the materials typically used for carton manufacture, such as paperboard or plastic. If it is desired, the carton blank may be made of, or adhered to, a barrier material. The carton blank may comprise outside- or inside-film laminated paperboard. The paperboard may be laminated with, e.g., a film of two-sided acrylic coated oriented polypropylene, e.g. "420HS" available from the Mobil Oil Corporation, or polyethylene. Or, the carton blank may comprise a barrier board such as "MVTR Board," or "Super MVTR Board," available from Jefferson Smurfit/Container Corporation of America. "MVTR Board" includes a mill-applied chemical barrier treatment as well as barriers applied in the printing operation. "Super MVTR Board" is a clay coated, chemically-treated paperboard having a high gloss top coating, catalytic or lacquer. A barrier may also be created by polyethylene or other extrusion coating or via printed coatings. For instance, the carton blank can be laminated to a barrier film of polypropylene. In this instance, barrier is taken to mean a water vapor transmission rate of greater than 0.5 grams of water per 100 square inches per 24 hours at 80° F./80% R.H., typically from 0.5 to 0.9, especially 0.7 for inside film laminated paperboard. "Super MVTR Board" has a typical MVTR of 0.8 with a useful range of 0.7 to 1.2.

The carton may include liners of various configurations, for example, a three sided liner such as liner 56 shown in FIG. 5 or a four sided liner. The liner serves to reinforce the structure of the carton and enhance its barrier properties.

The carton and/or the liner may be inside-or outside-film laminated to provide barrier properties; or, a barrier material such as "Super MVTR Board" may be used as the carton blank and/or the liner.

Particularly preferred are four-sided liners having panels substantially matching the four panels of the carton. Although not required in view of the present invention, the liner may include extra thickness remote from the handle to help balance the carton when it is in the flat, tubular form shown in FIG. 2. Extra thickness to aid in balancing can also be incorporated elsewhere in the flat tubular carton such as embossments in the carton blank itself or thickened score lines. Such balancing means are disclosed in the Giblin et al. application mentioned above. The extra thickness provided by such balancing solutions may desirably be within the range of from 0.08 to 0.25, preferably 0.1 to 0.25 inch thickness.

The carton of the invention is advantageously used to contain powdered detergent, preferably concentrated or superconcentrated detergents. Preferred densities for such detergents include 500 to 700 grams per liter for concentrated and, especially 700 to 1000 grams/liter for superconcentrated. Preferably a scoop is enclosed within the detergent carton to assist the consumer in dispensing the product.

If desired, instead of locating the hinge on one of the broad panels, it may be situated on one of the narrow panels.

As indicated above, it is believed that the present invention is useful for cartons other than those of the type illustrated herein. For instance, more conventional detergent cartons having fitments such as those disclosed in Gunn U.S. Pat. No. 4,732,315 may be manufactured in accordance with the present process using the instant magazines, with or without the integral means disclosed therein for increasing carton thickness. The disclosure of the Gunn patent is hereby incorporated by reference. The present invention is also believed useful for stackable objects other than detergent cartons, especially objects which stack unevenly and which are flat. The magazine and process of the invention may also be useful in feeding cartons and other objects one at a time to, e.g., a picking apparatus, even where the objects do not stack unevenly. While a partially enclosed magazine is disclosed, other types of chutes may be employed in the invention.

It should be understood, of course, that the specific forms of the invention herein illustrated and described are intended to be representative only as certain changes may be made therein without departing from the clear teachings of the disclosure. Accordingly, reference should be made to the following appended claims in determining the full scope of the invention.

What is claimed is:

1. A magazine in combination with a plurality of flattened tubular cartons having a localized increase in thickness leading to an imbalanced stack, loaded in said magazine, said magazine comprising a first side wall, a second side wall on the side opposite said first, side wall, front carbon motion restraining means and rear carton motion restraining means limiting the movement of said carton in directions parallel to said sidewalls, said sidewalls extending curvedly from a first carton open end bounded on its periphery by said first and second sidewalls and said front and rear carton motion restraining means to a second carton open end defined by said first and second sidewalls and said front and rear carton restraining means, said curvature extending continuously from said first to said second open end so as to accommodate the unbalanced stack of cartons.

2. A magazine in combination with a plurality of flattened tubular cartons having a localized increase in thickness leading to an imbalanced stack, loaded in said magazine said magazine comprising a first side wall, a second side wall on the side opposite said first side wall, front carton motion restraining means and rear carton motion restraining means limiting the movement of said carton in directions parallel to said sidewalls, at least one of said front and rear carton motion restraining means not extending uninterruptedly between said first and second sidewalls, said sidewalls extending curvedly from a first carton open end bounded on its periphery by said first and second sidewalls and said front and rear carton motion restraining means to a second carton open end defined by said first end second sidewalls and said front and rear carton restraining means, said curvature extending continuously from said first to said second open end so as to accommodate the unbalanced stack of cartons.

3. The combined magazine and cartons according to claim 2 wherein the plane of the first cartons opening is disposed at an angle of between substantially 70 and 100 degrees relative to the plane of the second carton opening.

4. The combined magazine and cartons according to claim 3 wherein the angle between the plane of the first carton opening and the angle of the plane of the second carton opening is between substantially 80 and 95 degrees.

5. The combined magazine and cartons according to claim 2 wherein said sidewalls and front and rear carton restraining means closely abut the edges of the tubular carton.

6. The combined magazine and cartons of claim 6 wherein the clearance between the edges of the tubular carton and the sidewalls and front and rear restraining means of said magazine is at no point greater than ½ inch.

7. The combined magazine and cartons of claim 6 wherein the clearance between the sidewalls and the front and rear restraining means and the edges of the carton is no greater than ¼ inch.

8. The combined magazine and cartons according to claim 1 wherein the flattened tubular cartons each further comprises a handle attached thereto and is of uneven thickness due at least in part to the presence of the handle.

9. The combined magazine and cartons according to claim 2 wherein the unevenness of the carton is such that the cartons stack at an angle of at least 0.3° per carton.

10. The combined magazine and cartons according to claim 9 wherein the cartons stack at an angle of at least 0.5° per carton.

11. The combined magazine and cartons according to claim 10 wherein the cartons stack at an angle of at least 0.8° per carton.

12. The combined magazine and cartons of claim 2 wherein one of said side walls extends below the other and wherein said magazine further comprises conveying means along the lower of said side walls.

13. The combined magazine of claim 2 futher comprising means attached to said magazine for opening said carton as it emerges from said magazine.

14. The combined magaine and cartons of claim 2 further comprising means stopping said carton as it emerges from said magazine.

15. A process of feeding a plurality of cartons having a localized increase in thickness leading to an unbalanced stack comprising conveying folded, flat, tubular carton blanks into a first open end of a magazine having curved sidewalls and front and rear carton motion restraining means limiting the movement of said cartons in directions parallel to said sidewalls and conveying said folded, flattened tubular carton blanks along a continuously curved path corresponding to the natural fanning of the cartons through a second open end in said magazine said first open end lying in a first plane and said second open end lying in a second plane, the first plane being disposed at an angle different from the second plane, said curved path accomodating the unbalanced stack of cartons.

16. The process according to claim 15 wherein said uneven thickness results from a handle disposed on the outside of said folded, flattened, tubular carton.

17. The process according to claim 15 wherein the angle between the plane of the first open end and the plane of the second open end is between 70 and 95 degrees.

18. The process according to claim 17 wherein the angle between the plane of the first open end and the plane of the second open end is substantially 90°.

19. The process according to claim 17 wherein the plane of the first open end is substantially horizontal and the plane of the second open end is substantially vertical.

20. A magazine for receiving flattened cartons comprising a first side wall, a second side wall on the side opposite said first side wall, front carton motion restraining means and rear carton motion restraining means limiting the movement of said carton in directions parallel to said sidewalls, said sidewalls extending in a continuous curve from a first open end bounded on its periphery by said first and second sidewalls and said front and rear carton motion restraining means to a second open end defined by said first and second sidewalls and said front and rear carton restraining means, one of said side walls extending below the other, and a belt traversing the inside of the lower of said curved sidewalls and movable with respect thereto, said inside of the lower sidewall forming a concave curve.

21. The magazine according to claim 20 further comprising belt guides on either side of the belt on said sidewall.

22. The magazine according to claim 20 further comprising belt driving means.

23. The magazine according to claim 22 wherein said driving means comprises a driving roller and wherein said magazine further comprises a major following roller.

24. The combined magazine and cartons of claim 2 wherein said first open end lies in a first plane and said second open end lies in a second plane, the first plane being disposed at a different angle from the second plane.

25. The combined magazine and cartons of claim 2 wherein said cartons are supported within said magazine by their flaps.

26. The process according to claim 15 wherein the cartons are supported within said magazine by their flaps.

27. The magazine of claim 21 in combination with a feeding device comprising means for holding and turning a case containing the cartons whereby to invert said case and position the inverted case over one of said magazine openings.

28. The combined magazine and feeding device of claim 27 wherein said case turning means comprises two sidewalls and a flange associated with at least one of said sidewalls said flange being movable between a first, open position parallel to said sidewalls and a second closed position perpendicular to said sidewalls.

29. The combined magazine and feeding device according to claim 27 wherein said case turning means comprises a bottom wall, a front wall and two sidewalls, the rear of said case turning means being open to receive said case and the top of said case turning means including means movable between a position preventing exit of said cartons from said case turning means and a position wherein said cartons are not prevented from exiting said case turning means when said case turning means is in the inverted position.

30. The combined magazine and feeding device of claim 27 further comprising an adjunct carton feeder disposed between said case turning means and said magazine, said adjunct carton feeder comprising brake means for restraining cartons and a carton retaining flange movable between an open position parallel to the sidewalls of the case turning means and a closed position perpendicular to the sidewalls, of the case turning means.

31. The combined magazine and feeding device of claim 27 further comprising a photocell positioned to sense the location of the cartons being fed into the case turning means and means for adjusting the feeding of cases to the case turning means and for controlling the operation of the case turning means responsive to the said photocell.

32. The combined magazine and feeding device of claim 31 further comprising a photocell positioned to sense the location of cartons within the magazine and means for controlling the operation of the case turning means responsive thereto.

33. The combined magazine and feeding device of claim 27 wherein the plane of the first open end of said magazine is disposed at an angle of between approximately 80° and 95° to the plane of the second open end.

* * * * *

UNITED STATES PATENT AND TRADEMARK OFFICE
CERTIFICATE OF CORRECTION

PATENT NO. : 5,344,279
DATED : September 6, 1994
INVENTOR(S) : Ashbaugh et al.

It is certified that error appears in the above-indentified patent and that said Letters Patent is hereby corrected as shown below:

Col. 9, claim 1, line 64, replace "first," with --first--.

Col. 9, claim 1, line 65, repalce "carbon" with --carton--.

Col. 10, claim 2, line 22, replace "first end second" with --first and second--.

Signed and Sealed this

Thirteenth Day of December, 1994

Attest:

BRUCE LEHMAN

Attesting Officer    Commissioner of Patents and Trademarks